(No Model.) 6 Sheets—Sheet 1.

W. E. WILLIAMS.
MACHINERY FOR CUTTING AND STICKING MATCH SPLINTS.

No. 552,161. Patented Dec. 31, 1895.

Witnesses
Inventor (No Model.) 6 Sheets—Sheet 2.

W. E. WILLIAMS.
MACHINERY FOR CUTTING AND STICKING MATCH SPLINTS.

No. 552,161. Patented Dec. 31, 1895.

(No Model.) 6 Sheets—Sheet 3.
W. E. WILLIAMS.
MACHINERY FOR CUTTING AND STICKING MATCH SPLINTS.
No. 552,161. Patented Dec. 31, 1895.

Witnesses

Inventor
W. E. Williams

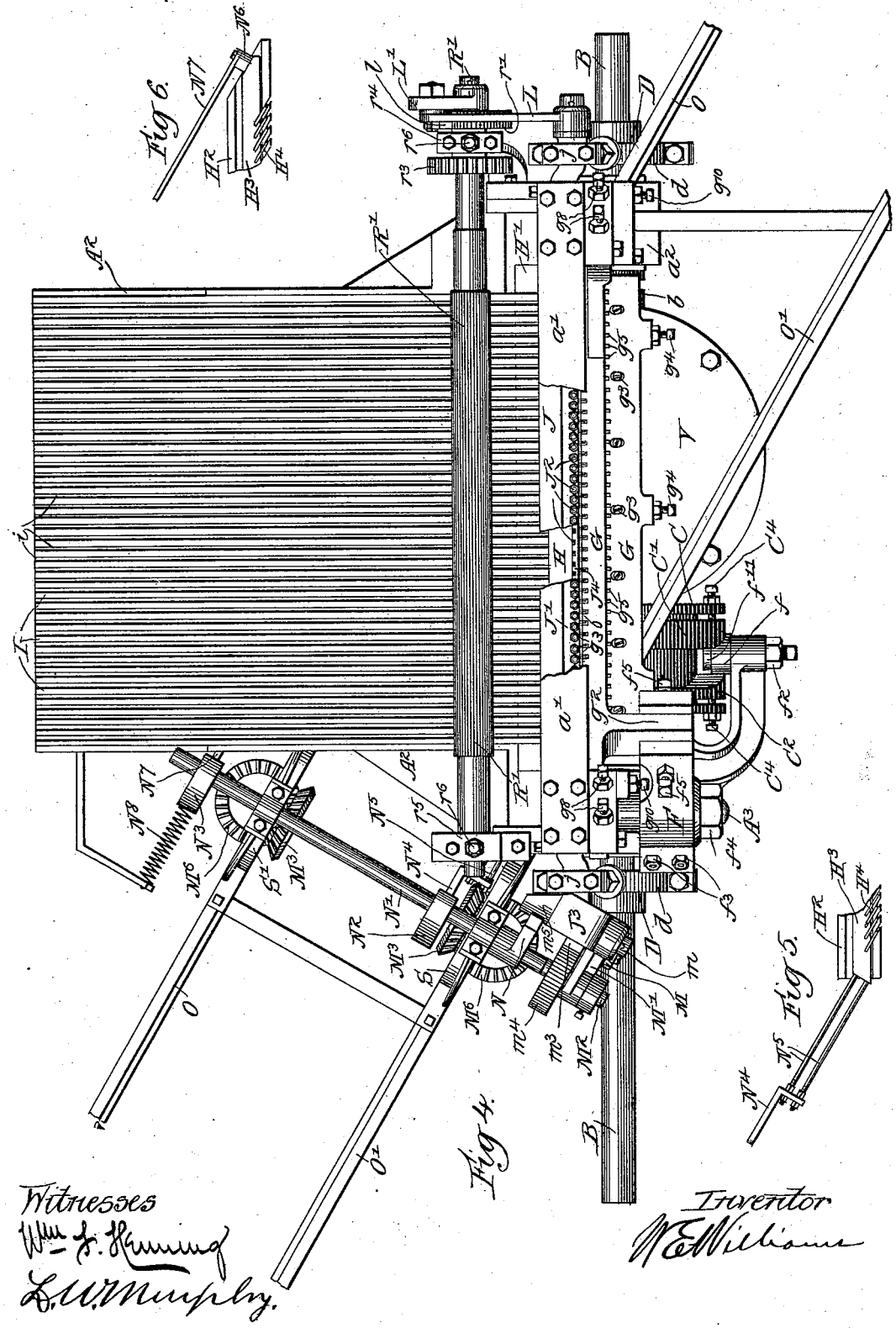

(No Model.) 6 Sheets—Sheet 5.
W. E. WILLIAMS.
MACHINERY FOR CUTTING AND STICKING MATCH SPLINTS.
No. 552,161. Patented Dec. 31, 1895.
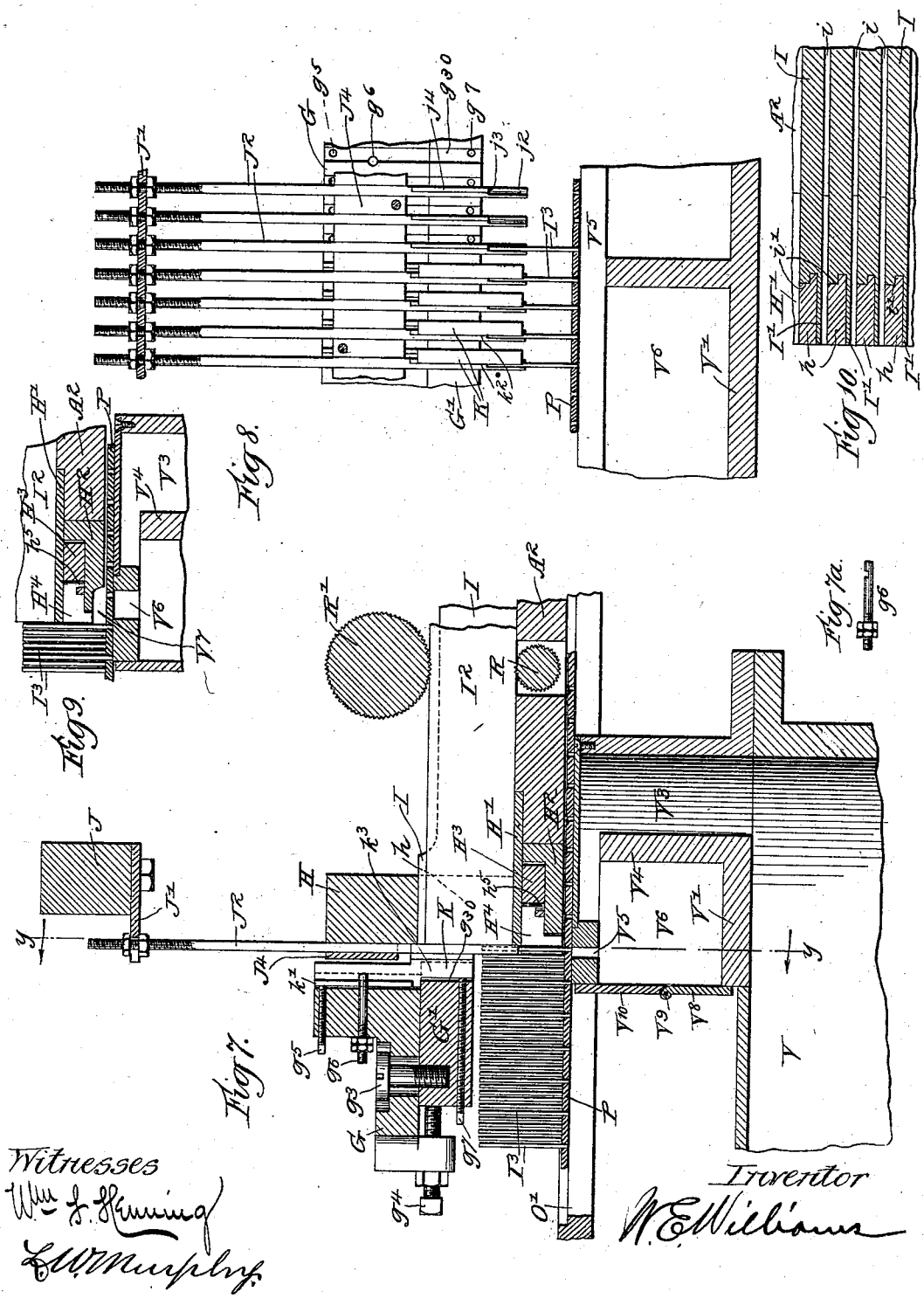

(No Model.) 6 Sheets—Sheet 6.
W. E. WILLIAMS.
MACHINERY FOR CUTTING AND STICKING MATCH SPLINTS.
No. 552,161. Patented Dec. 31, 1895.
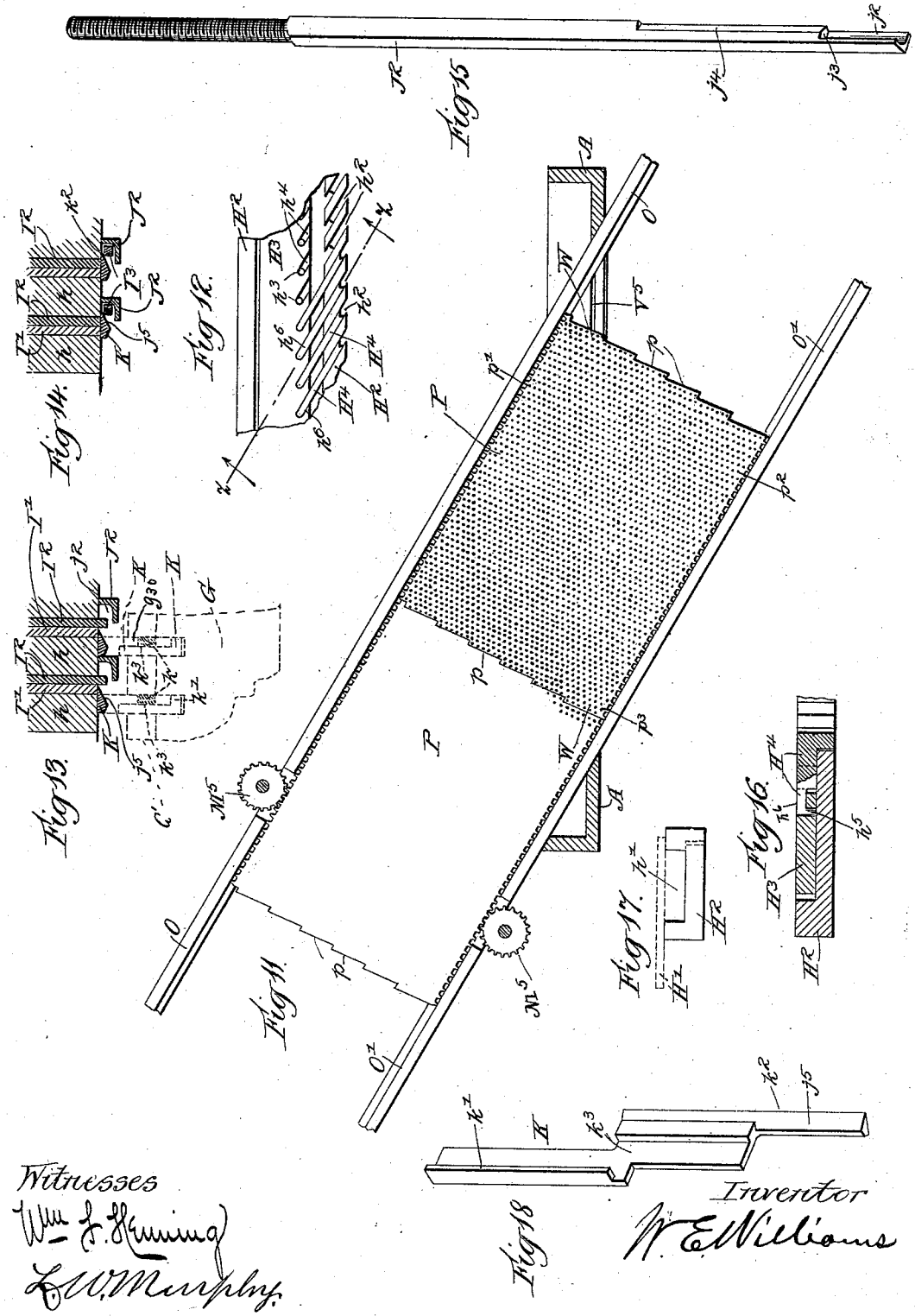

UNITED STATES PATENT OFFICE.

WILLIAM ERASTUS WILLIAMS, OF CHICAGO, ILLINOIS.

MACHINERY FOR CUTTING AND STICKING MATCH-SPLINTS.

SPECIFICATION forming part of Letters Patent No. 552,161, dated December 31, 1895.

Application filed February 23, 1893. Serial No. 463,436. (No model.)

*To all whom it may concern:*

Be it known that I, WILLIAM ERASTUS WILLIAMS, a citizen of the United States, residing at Chicago, in the county of Cook and State of Illinois, have invented a new and useful Improvement in Machinery for Cutting and Sticking Match-Splints, of which the following is a specification.

My invention relates to machines which cut match-splints from veneer and automatically stick them into a plate or rack for dipping; and the object of the invention is to provide a machine which will do the work with rapidity and certainty and will cut the splints clean and smooth; and the invention consists in the mechanical elements and combinations hereinafter set forth, and pointed out in the claims hereof.

Reference will be had to the accompanying drawings, in which—

Figure 1:
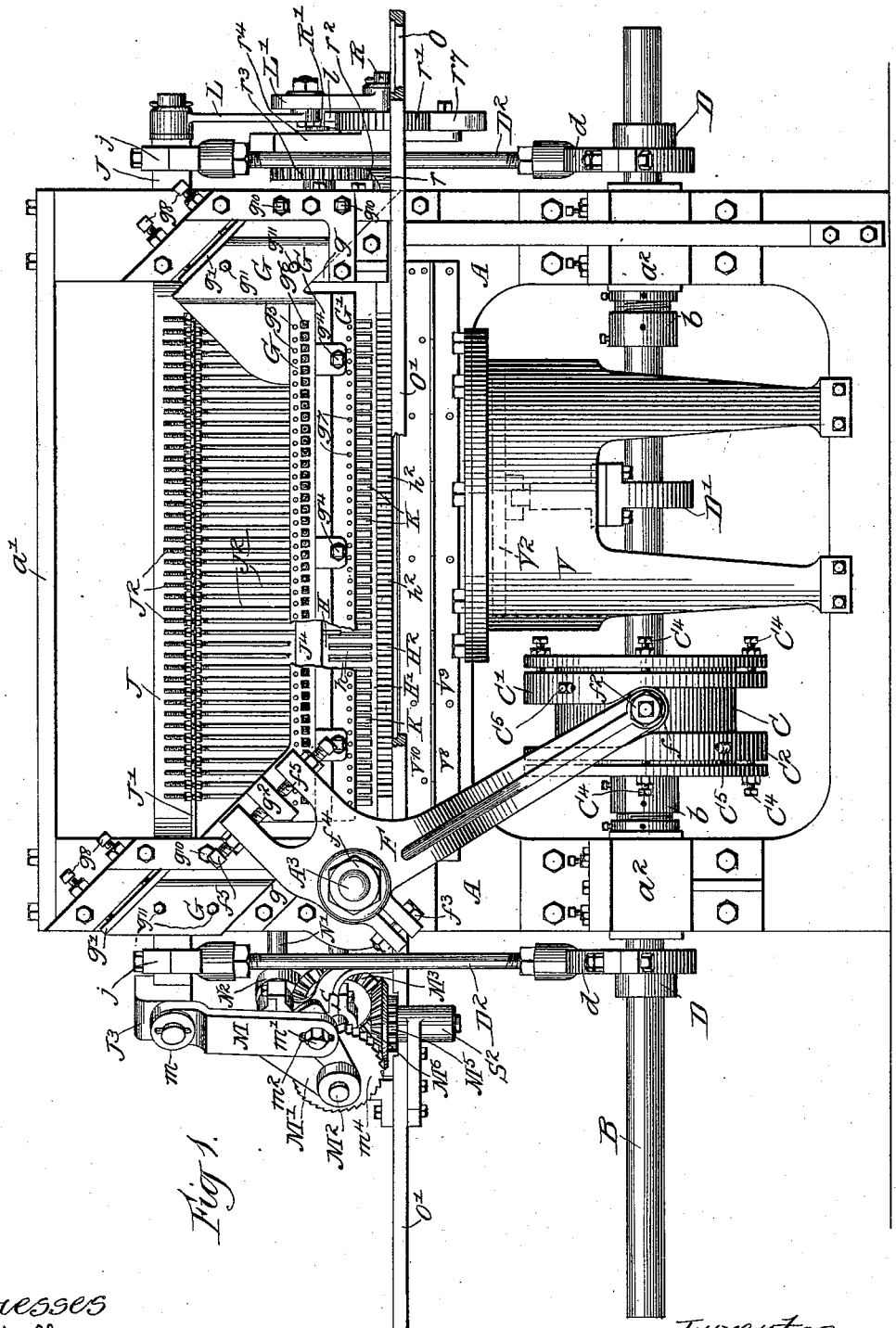
Figure 2:
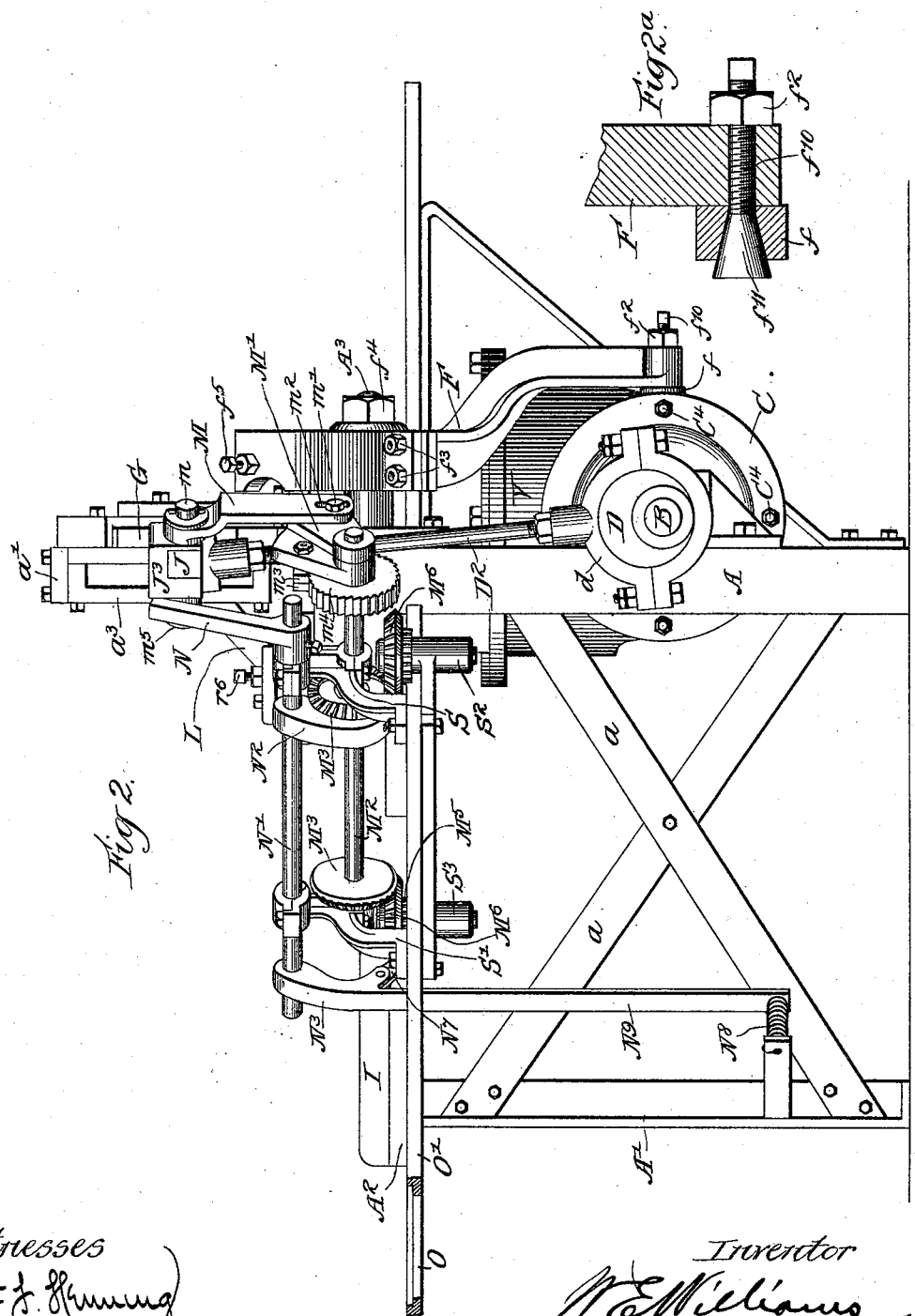
Figure 3:
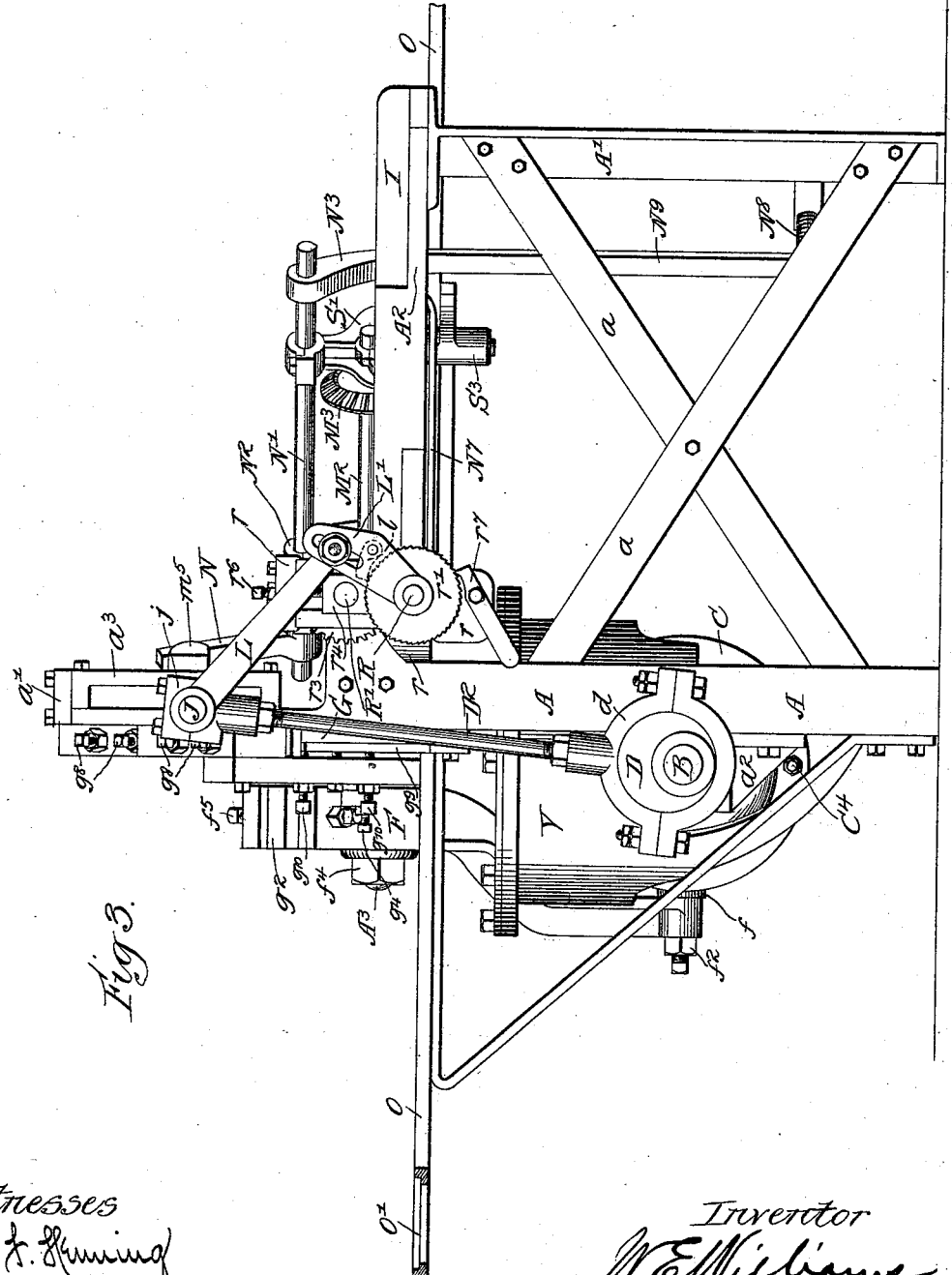

Figure 1 is a front elevation of the machine. Fig. 2 is a left-side elevation. Fig. $2^a$ is a vertical section through the cam-wheel pin and arm. Fig. 3 is a right-side elevation of the machine. Fig. 4 is a plan view. Fig. 5 is a plan of the connections to the shift-bar. Fig. 6 is a plan of the connection to the shift-bar at the other end. Fig. 7 is a vertical sectional view through the cutter-head and blast-chamber transversely of the cutter-head. Fig. $7^a$ is a plan of the knife-locking bolt. Fig. 8 is a vertical back sectional view of the match-sticker punches on the line $y\,y$, Fig. 7. Fig. 9 is a sectional view on the same line as Fig. 7, showing an alternate design of the blast-opening to the holes in the rack. Fig. 10 is a plan sectional view of the cutter-head block and veneer-guides on a line through the body of the veneer-guides. Fig. 11 is a plan of the guide-ways and racks and the gears which drive them. Fig. 12 is a plan of a section of the guide-bar and shifter-bar and shifters. Fig. 13 is a plan sectional view on a plane passing through the top of veneer-guides, showing the veneer-knives and sticker-punches in position just before cutting the splint. The cutter-head and knife-fastenings are shown in dotted lines. Fig. 14 is the same after the splint is cut as it is in position to be stuck. Fig. 15 is a perspective of one of the sticker-punches. Fig. 16 is a vertical sectional view through the guide-bar and shifter-bar and shifters on the line $zz$, Fig. 12, a part of the shifter shown full. Fig. 17 is an end view of the splint-guide bar with the bar H in dotted lines. Fig. 18 is a perspective of one of the knives.

In the drawings, A designates the front vertical frame-piece of the machine which forms the two front legs. A' designates the rear frame-piece forming the rear legs, and $A^2$ the bed-plate of the machine. The frame-pieces A A' are connected by braces $a$, and bar $a'$ is fastened across the top of the frame A.

Held in bearings $a^2$ is the operating-shaft B. This operating-shaft is driven by belt-pulleys, (not shown,) and it carries a cam-wheel C and eccentrics D and an eccentric D', and carries adjacent to the boxes $a^2$ two adjusting-collars $b$. These collars are made in two pieces, one threaded into the other, and on one side there is a shoulder on the shaft against which the collar abuts, and the other end of the collar abuts against the box $a^2$, and when adjusted the two parts of the collar are held in a fixed position on shaft B by set-screws. Thus by these collars $b$ the shaft B can be held in exact position against the thrust of the cam-wheel C. This cam-wheel C is provided with two adjustable cam-rings C' $C^2$, which are adjusted laterally by the screws $C^4$, and the rings are adjusted circumferentially by revolving them on the wheel C, and they are held in a fixed position by the set-screws $C^5$. These cam-rings actuate a roller $f$ on a taper-pin $f^{11}$ threaded at $f^{10}$ into a cam-arm F, and the pin $f^{11}$ is held in a fixed position by a jam-nut $f^2$. Thus the wear on the cam-surface may be taken up by the adjustments of the cam-rings C' $C^2$ and the wear on the cam-roller $f$ be taken up by the adjustment of the pin $f^{11}$. The cam-arm F is carried and oscillates on the pivot-pin $A^3$ on the frame A, and the wear on the pivot $A^3$ is taken up by the screws $f^3$, and the arm F is held on the pivot $A^3$ by the nut $f^4$ and actuates from the cam C the cutter-head G and is connected by the screws $f^5$ to a projection $g^2$ of cutter-head G, which is held in ways $g$, adjusted in said ways vertically by gibs $g'$ adjusted by screws $g^8$ and adjusted toward the frame A by gibs $g^9$, Fig. 3, adjusted by screws $g^{10}$ and adjusted from the frame A by similar gibs adjusted by screws $g^{11}$. This cutter-head carries a steel bar G', into which is keyed a set of knives K. The steel bar G' has notches $g^{30}$, Figs. 4, 7, 8, and 13, on its forward edge, into which the knives K are keyed by the keys $k$, and into these notches there are set-screws $g^7$ abutting against the knives K, and the bar G' is held to the cutter-head G by the screws $g^3$, which pass through slots in the cutter-head G, and the bar G' is adjusted forward by the screws $g^4$. The cutter-head G is notched to correspond with the notches of the bar G' and has holes into which are threaded the set-screws $g^5$. Projecting into the notches and abutting against the knives K and through the cutter-head G there are bolts $g^6$, the centers of which pass over the edges of the projections $k'$ of the knives K, and slots are cut into the edges at the ends of the bolts $g^6$, (see Fig. 7$^a$,) that they may engage the projections $k'$ of the knife K and hold it back against the set-screws $g^5 g^7$. The knives K are made with cutting-edge $k^2$ and key-seat $k^3$ and are cut away below to permit the match-splint to pass out after being stuck in the rack.

Across the front of the machine, above the bed-plate A$^2$ and back of the cutter-head G, there is a cross-bar H, Figs. 1, 4 and 7. From this bar down to a plate H' there is a set of blocks $h$, Figs. 1, 7, 10, 13 and 14, spaced apart, leaving an opening between them. These blocks are securely fastened into the bar H and plate H', and they form the cutter-head block. On top of the bed-plate A$^2$ there is a set of wooden guide-bars I, which are fastened down on the bed A$^2$ and are of such width as to permit the thickness of a strip of veneer edgewise between them, leaving slot $i$ for the admission of the veneer, and the forward ends of the bars I are cut away at $i'$, Fig. 10, leaving a narrow piece I' extending into the spaces between the blocks $h$. The only mission of the bars I is to furnish guideways for the veneer up to the cutter-head block. They are not made as deep as the veneer is wide, to permit the operator to clasp the veneer and feed it forward into the machine.

The veneer is shown as I$^2$, Figs. 7, 13 and 14, and the severed splint from the same as I$^3$, Figs. 7 and 14. On the back of the frame A there are fixed blocks $a^3$, which form guideways into which a sticker-punch bar J is carried. The bar J is driven by the eccentrics D through the connecting-rods D$^2$ pivoted to bar J at $j$. This bar J carries a plate J', into which the sticker-punches J$^2$ are fastened by nuts, which fastening permits of an adjustment of the sticker-punches to suit their work. These sticker-punches, Fig. 15, are recessed at their lower ends $j^2$ and have shoulders $j^3$, which strike the ends of the match-splints and stick them into the rack, and the corner $j^4$ of the punch J$^2$ is cut away to permit it to fit closely to the surface $j^5$ of the knife K, Figs. 8, 13, 14, 15 and 18, in passing down by the knife, thereby insuring the carrying down of the splint. These sticker-punches J$^2$ are held in place by a keeper-bar J$^4$, Figs. 1, 4, 7 and 8, notched to inclose the body of the sticker-punches J$^2$ and screwed to the bar H. Onto the end of the bar J there is pivoted a link L connecting a lever L' pivoted on a feed-roller R held in bearings in the bed-plate A$^2$ and supported at the end by a box-hanger $r$. The lever L' carries a pawl $l$ engaging a ratchet $r'$ on the roller R. The ratchet $r'$ is held from moving backward by the pawl $r^7$. On roller R there is a gear-wheel $r^2$, Fig. 1, engaging a gear-wheel $r^3$ on the feed-roller R', which feed-roller R' is held in boxes $r^4 r^5$ and is adjusted to its work by set-screws $r^6$. The rollers R and R' are corrugated for the distance across the bed-plate A$^2$ engaging the edges of the strips of veneer, and thereby feed the veneer forward to the cutter-head block. To the other end of the bar J there is fixed a block J$^3$, on one end of which there is a pivot $m$, on which is carried a link M pivoted by a pin $m'$ in a slot $m^2$ to a block M' pivoted on a shaft M$^2$. This block M' carries a pawl $m^3$ working a ratchet $m^4$ keyed to shaft M$^2$, and the block J$^3$ has a bearing-surface $m^5$ against which the arm N works. The arm N is keyed to the shaft N', which it actuates. Underneath the bed-plate A$^2$, at an angle of thirty degrees with the face of the cutter-head, there are two guide-bars O O', which carry the match-racks P. The match-racks P are provided with gear-teeth on their edges, into which gears M$^5$ engage and feed the racks through the machine. The match-racks P are made of a plate of iron or steel in which there are holes drilled for the reception of the match-splints at regular intervals in their width and length, and owing to the fact that the strips of veneer are necessarily spaced across the bed-plate A$^2$ at a greater distance apart than is desirable to have the matches held in the racks while dipping, the racks are passed through the machine underneath the cutter-head and cutter-head block at an angle of thirty degrees, which brings the match-splints in the rack in rows just half of the width of the space between the strips of veneer on the bed-plate A$^2$, and by varying this angle any desired width between the splints in the racks may be obtained up to the width between the strips of veneer on the bed-plate A$^2$, and by this arrangement of passing the racks through the machine the splints are stuck into the racks in straight lines W W, Fig. 11; but these lines extend diagonally across the rack and a part of the same row of splints are stuck in two racks, and the arrangement of the holes in the racks brings the holes in line transversely of the rack at an angle with the edges of the rack, which angle increases as the distance lengthwise of the rack between the holes in the rack diminishes. The racks are cut away at the ends equidistant between the lines of holes and are stepped off, as shown at $p\,p\,p$, to make the rack-teeth on their edges equal, Fig. 11, and the angle of the line of holes across the rack is shown by $p'$ $p^2$ $p^3$. On the guide-bars O O' at the left of the machine are two shaft-hangers S S' which support the shafts $M^2$ $N'$, and fastened underneath the bars O O' there are two shaft-hangers $S^2$ $S^3$ which carry the vertical shafts of the gear-wheels $M^5$. On the same shafts and above the gears $M^5$ are bevel-gears $M^6$ which engage gear-wheels $M^3$ on the shaft $M^2$, whereby through the mechanism before described the racks P are fed intermittently through the machine.

Underneath the plate H' and in front of the bed-plate $A^2$ is a splint-guide bar $H^2$, Figs. 1, 12, 16 and 17. This bar is recessed at $h'$, Fig. 17, in which it carries the shifter-bar $H^3$, and this bar $H^2$ projects a little beyond the plate H', Figs. 7 and 17, and has notches $h^2$, Fig. 12, in its forward edge at an angle to correspond with the movement of the match-splints in the rack in feeding forward. These notches $h^2$ extend back into the bar back of the edge of the plate H' sufficient for the shifters $H^4$ to be drawn back entirely underneath the plate H'. The shifter-bar $H^3$ has holes $h^3$ and notches $h^4$ in its top and forward edge, into which holes $h^3$ the projection $h^5$ of the shifter is inserted, and the body $h^6$ of the shifter lies in the notches $h^4$ of the bar $H^3$, and the movement of the bar $H^3$ forward in the direction of the notches $h^2$ and at right angles to the shaft N' moves out the shifters $H^4$, which force out any accumulated débris in the notches $h^2$ and then the withdrawal of the shifters $H^4$ leaves the notches $h^2$ clean and free for the admission of a new set of splints to enter the holes in the rack immediately below, and the sole purpose of the notches $h^2$ of the bar $H^2$, is to guide the splints into the holes for them in the racks, and to keep those notches $h^2$ open free for the admission of the splints every time is a desideratum.

The shifter-bar $H^3$ is driven by the arms $N^2$ $N^3$ on the shaft N'. $N^2$ is connected by a link $N^4$, Fig. 5, to two rods $N^5$ fixed into the end of the shifter-bar $H^3$, Figs. 4 and 5, and the other end of the shifter-bar $H^3$ is connected by a clip $N^6$ to a rod $N^7$ to the arm $N^3$ on the shaft N', and thus both ends of the bar $H^3$ are actuated by the shaft N' oscillated by the block $J^3$ on the bar J and the arms $N^2$ $N^3$ and shaft N', and hence bar $H^3$ is drawn back by a spring $N^8$ fastened to the frame A' and to an extension $N^9$ of arm $N^3$.

In cutting the splints quite a quantity of shavings and imperfect ones are made, and in order to aid in clearing the holes in the racks and the face of the cutter-head I use an air-blast, and the blast blows up through the holes in the racks when the racks are being fed forward, and while the splints are being stuck a suction down through the holes in the racks is produced to aid in drawing the ends of the splints into the holes in the rack. This alternate blast and suction is produced by a pump V, which is fastened on a cross-bar V', Fig. 7, of the frame A and has a solid piston-head $V^2$, Fig. 1, driven by eccentric D' on shaft B, and the air passes up on this upstroke through the passage $V^3$, Fig. 7, over the top of the wall $V^4$ and up through the slot $V^5$, which is directly underneath the row of holes in which the splints are stuck, and thus aids in clearing them, and on the downward movement of the piston $V^2$, which is simultaneous with the downward movement of the sticker-punches, the air is drawn down through the holes in the plate, thus aiding in drawing the splints into the holes. The chamber $V^6$ acts as a catch-basin to keep the splints from going into the air-cylinder, and the entrance to the chamber is closed by the bar $V^{10}$, Figs. 1 and 7, fixed to the walls of the chamber, and to it at $V^9$ is hinged a gate-plate $V^8$, which may be opened and the shavings removed. In case the shifters $H^4$ should be not used it is desirable to change the direction of the air-blast and cause it to pass out underneath the guide-bar $H^2$ forward and back in a line parallel with the surface of the racks, in which event the opening $V^5$, Fig. 7, should be moved a little back, leaving the row of holes into which the splints are stuck covered, and the opening made wider, as shown by $V^6$, Fig. 9, and cut away the shifters on the bottom to permit air-passages, as shown by $V^7$, Fig. 9. Thus the air passes through several rows of holes in the racks and out and in through the passages $V^7$ and serves to blow away any débris that may accumulate in front of the guide-bar $H^2$ and clog the holes in the rack and aids to draw the ends of the splints as they come down into the guideways, whereby they will be more certainly directed into the holes in the rack.

The operation of the machine is thus: Presuming that all the slots $i$ on the table $A^3$ are filled with veneer and it is fed forward to the position shown as $I^2$, Fig. 13, and the machine is in the position shown in Figs. 1, 2, 3, 4, 12 and 13, and the machine in motion at this position, the cam-ring C' throws over the cam-arm and cutter-head G, moving the knives from position Fig. 13 to position Fig. 14, severing splints from ends of veneer and pushing them into the recess $j^2$ and under the shoulder $j^3$ of the sticker-punches $J^2$. The movement of the knives in doing this is downward and forward in the direction of ways $g$, thereby producing a drawing cut in severing the match-splint, which aids in cutting smoothly; and when the knives are in position they rest during the travel of the sticker-punches downward, and by so doing they hold the match-splint into the recess $j^2$ during the entire time of the operation of sticking. Thereby the upper ends of the splints are inclosed while being stuck, which position is shown at the point of completion of the sticking by Figs. 7 and 8, and from this point the cam-ring $C^2$ moves back the knives to position Fig. 13 in a short interval, thus clearing the entrance for the feeding forward of the veneer. On the upward movement of the sticker-punch, bar J, by its connections by pawl and ratchet to feed-rolls, feeds the veneer forward the requisite distance for a new set of splints. The veneer does not commence to feed immediately on the commencement of upward stroke, owing to the spacing of the teeth on the ratchet-wheel $r'$, which permits the pawl to travel a little past the number of teeth required, but not far enough to engage the next tooth, which action gives time for the knives to clear the entrance for the veneer. The feeding of the racks is also done by the upward movement of the sticker-bar J by its ratchet connection to gearing before described, but the racks do not commence to travel until the link M has traveled upward the length of the slot $m^2$, which gives time for the end of the sticker-punch $J^2$ to clear the splint it has just stuck, and simultaneous with the movement of the racks the arm N is moved by the projection $m^5$ of the bar J coming in contact with it, and thereby moves forward the shifters $H^4$, pushing out the splints from the guideways $h^2$ of the bar $H^2$ should they not be carried out by the rack. Thus the splint-guideways $h^2$ are forcibly cleared each time for a new set of splints.

On the downward movement of the sticker-punches $J^2$ the piston-head $V^2$ of the wind-chamber V moves downward, thereby creating a draft through the holes in the racks, sucking the splints into the holes; and on the upward movement of the sticker-punches the piston moves upward, and thereby the draft is the other way, clearing the entrance to the new set of holes in the racks, and so on *ad infinitum*.

What I claim is—

1. In a match machine mechanism for cutting and sticking match splints into a rack for dipping, the combination of mechanism for holding and feeding a number of strips of veneer into the machine apart from and parallel to each other, mechanism for cutting simultaneously a splint from each strip of veneer, mechanism for sticking the splints so cut lengthwise into a rack for dipping, said cutting mechanism consisting of a slotted cutter-head block through which the feeding mechanism projects the ends of the veneer the determined thickness of a splint, and a series of knives cleaving the splints in line of the face of the cutter head block, and holding said splints in position to sticker punches, which sticker punches have shoulders abutting against the ends of the splints in sticking, and projections extending down the sides thereof engaging the ends of the splints substantially as shown.

2. In a match machine a cutter head block having a series of slots through which strips of material the thickness of a match are projected outward from the face thereof equaling the width of a match, in combination with a cutter head carrying a set of knives cleaving the splints in a plane coinciding with the face of the cutter head block, said cutter head carrying knives provided with actuating mechanism whereby the knife edge travels transversely and longitudinally of the splints in cutting, thereby producing a drawing cut.

3. In a match machine for cutting and sticking match splints, a cutter head block having a series of slots through which strips of material the thickness of a match are projected outward from the face thereof, equaling the width of a match, in combination with a cutter head, carrying a set of knives cleaving the splints in a plane coinciding with the face of the cutter head block, said cutter head carrying knives provided with actuating mechanism whereby the knife edge travels transversely and longitudinally of the splints in cutting, thereby producing a drawing cut, in combination with mechanism for sticking the splints so cut into racks for dipping, substantially as shown.

4. In a match machine mechanism for cutting match splints from veneer, the combination of a cutter head block past which the veneer is projected the width of a match, a knife provided with mechanism to pass it over the face of said cutter head block cutting the splint, and a sticker punch actuated to project the splint lengthwise when cut, said knife in cutting carrying the splint laterally into engagement with the sticker punch, said sticker punch having a projection on the side thereof engaging the end of the splint to hold it in position when being stuck, substantially as shown.

5. In a match machine having a cutter head block provided with slots through which material is projected the width of a match, mechanism for cutting splints on the line of the face of said block laterally to the length of said slots, mechanism for projecting said splints longitudinally of their length into racks for dipping, said projecting mechanism engaging the end and side of each splint and moving therewith, in combination with a fixed guideway "$H^2$" guiding the ends of the splints into the racks, substantially as shown.

6. In a match machine mechanism for cutting splints, mechanism for projecting the splints cut into a rack for dipping, which mechanism for projecting the splints is composed in part by a sticker punch, which punch has projections down two adjacent sides of the splint to hold it in position and a shoulder abutting against the end of the splint in sticking the same.

7. In a match machine for cutting match splints having a cutter head block having a series of openings for the admission of the stock whereat the same is cut into splints, and having a cutter head carrying a series of knives, one for each opening in the block, said knives held in slots in said cutter head and provided with two set screws abutting against each knife thereof, whereby either end of said knife may be adjusted to the cutter head as shown, in combination with a locking bolt holding the knives against the set screws as shown.

8. In a match machine having mechanism for cutting match splints having a cutter head block through which the stock is fed and cut into splints, substantially as shown and described, a cutter head carrying a knife cutting in the plane coinciding with the plane of the face of the cutter head block, said knife held in a slot in said cutter head at right angles to the said cutting plane and adjusted outwardly from said cutter head block by set screws and held laterally in said slot in cutter head by a key, substantially as shown.

9. In a machine for cutting and sticking match splints, mechanism for passing the racks into which the splints are stuck underneath the cutter head and the cutter head having a downward and lateral movement in cutting, the downward movement aiding in carrying down the splint in sticking the same, and the return or upward movement aiding in freeing the cutters and stickers from débris.

10. In a machine for cutting and sticking match splints, the combination of a set of sticker punches "$J^2$" and a set of knives "K" made to conform to each other in the manner shown to inclose the end of the match splint on three sides to insure its being stuck and each having an independent movement.

11. In a machine for cutting and sticking match splints a cutter head block and a cutter head carrying knives cutting splints on the face of the cutter head block, and a set of sticker punches sticking the splints into a rack for dipping, a guide bar "$H^2$" having notches guiding the splints into the rack for dipping, in combination with shifters "$H^4$" which push out and clear the notches for the entrance of new splints, substantially as and for the purpose described.

12. In a machine for making and sticking match splints, racks having their ends fitted to each other by being stepped off bringing the division line between the racks' ends about equidistant from the rows of perforations into which the splints are stuck, substantially as shown.

13. In the combination substantially as shown, the sticker bar "J" carrying sticker punches "$J^2$," which sticker punches have projections "$j^2$" down the side of the splints for the purpose described, and the rack feeding mechanism substantially as described, connected to sticker bar "J" by link "M" whereby the upward stroke of the sticker bar feeds the racks which link "M" has a slot "$m^2$" permitting the sticker punches to lift off the splints before the commencement of the feeding of the racks.

14. In a machine for making and sticking match splints, mechanism substantially as described, for producing a wind blast and the proper conduits therefor, the ends of which terminate to and over the rows of holes in the rack, into which the splints are stuck, whereby the air is drawn down through the holes in the racks aiding in sticking the splints substantially as shown.

15. In a machine for making and sticking match splints, mechanism substantially as described for producing a wind blast and the necessary conduits therefor, the ends of which terminate to and over the rows of holes in the rack, into which the splints are stuck, said blast producing mechanism actuated to produce a suction down through the holes in the racks during the period of time the splints are being stuck and to blow up through the holes in the racks during the period that the racks are fed and splints are cut thereby aiding in freeing the holes of débris, substantially as shown.

16. In a machine for cutting and sticking match splints, substantially as shown and described, having cutting mechanism cutting the splints with knife edges transversely of the grain of the wood, said cutting mechanism having a cutter bar "G" and knives "K" said knives "K" having the cutting edge "$k^2$" and body "$k^3$" for holding the same in the cutter head and the lower end cut away, whereby the same is made small enough to come within the space between the splints when the same are stuck in the rack.

17. The combination with a head block provided with slots each allowing the passing of a single veneer, of a series of knives arranged alongside said slots, respectively, in the plane of the block's face, means for moving said knives simultaneously across the corresponding slots, and splint sticking devices arranged to act between the planes in which the veneers project through the slots.

18. The combination with reciprocating splint cutting and sticking mechanisms, of rack plates arranged below the same to move obliquely with reference to the cutting and sticking plane, a splint guiding bar parallel to said plane and provided with marginal notches parallel to the direction of motion of the plates, and shifters lying normally at the inner limits of the notches and operated by the movement of the reciprocating parts to slide forward at intervals and eject débris from the notches.

19. The combination with the splint guide bar having the lateral notches, of the shifter bar movable transversely to the axes of splints lying in said notches, the shifters connected to the shifter bar and lying in said notches, respectively, the rock shaft mounted at right angles to the direction of said notches, means for rocking said shaft at intervals, and rods connecting the ends of the shifter bar to arms upon said rock shaft, substantially as and for the purposes set forth.

20. The combination with splint cutting and sticking mechanism, of air conduit opening at one side of but approximately in the cutting and sticking plane, rack plates arranged to pass between said mechanism and the conduit opening, and means for producing alternately an inward and an outward air current through said opening; whereby the splints are guided into the rack apertures and the débris is blown away.

21. The combination with splint cutting and sticking mechanism, of an air chamber alongside the same, a passage leading into the upper part of said chamber, means for creating air currents alternately in opposite directions through said passage, and an opening in said chamber delivering and receiving air in approximately the plane of said mechanism; whereby said mechanism may be subjected to alternating currents and the débris taken into the chamber by the one current may drop below the line of the reverse current.

22. The combination with a head block adapted to hold a series of separated veneers and means for cutting a splint from each veneer, of means for pushing aside the splints so cut, and means for sticking them while thus displaced; whereby the veneers may be fed during the operation of sticking.

23. In a machine of the class described, the combination with a suitably supported plate provided with perforations to receive, respectively, a series of splints presented endwise to the plate, of means for delivering splints upon one side of the plate, and means for producing an air current through said perforations toward the opposite side of said plate; whereby the splints are drawn accurately into position.

In witness whereof I have hereunto subscribed my name in the presence of two witnesses.

WILLIAM ERASTUS WILLIAMS.

Witnesses:
R. E. DAWLEY,
CHAS. P. DAWLEY.